(12) United States Patent
Magel et al.

(10) Patent No.: US 11,242,939 B2
(45) Date of Patent: Feb. 8, 2022

(54) PROPORTIONAL VALVE FOR CONTROLLING A GASEOUS MEDIUM

(71) Applicant: Robert Bosch GmbH, Stuttgart (DE)

(72) Inventors: Hans-Christoph Magel, Reutlingen (DE); Andreas Gruenberger, Spraitbach (DE); Stephan Wursthorn, Esslingen A.N (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/640,846

(22) PCT Filed: Jun. 25, 2018

(86) PCT No.: PCT/EP2018/066881
§ 371 (c)(1),
(2) Date: Feb. 21, 2020

(87) PCT Pub. No.: WO2019/037924
PCT Pub. Date: Feb. 28, 2019

(65) Prior Publication Data
US 2021/0025514 A1    Jan. 28, 2021

(30) Foreign Application Priority Data
Aug. 21, 2017   (DE) .................... 10 2017 214 506.4

(51) Int. Cl.
*F16K 31/06* (2006.01)
*H01F 7/08* (2006.01)
(Continued)

(52) U.S. Cl.
CPC ...... *F16K 31/0655* (2013.01); *F16K 31/0675* (2013.01); *H01F 7/081* (2013.01);
(Continued)

(58) Field of Classification Search
CPC ............. F16K 31/0655; F16K 31/0675; H01F 7/1607; H01F 2007/085; H01F 2007/086
(Continued)

(56) References Cited

U.S. PATENT DOCUMENTS 5,687,698 A    11/1997  Mastro et al.
6,206,038 B1 *  3/2001  Klein ................... B60T 8/5025
                                           137/596.17
(Continued)

FOREIGN PATENT DOCUMENTS

CN         106489046 A      3/2017
DE    102005027779 A1     12/2006
(Continued)

OTHER PUBLICATIONS

International Search Report for Application No. PCT/EP2018/066881 dated Oct. 4, 2018 (English Translation, 2 pages).

*Primary Examiner* — Matthew W Jellett
(74) *Attorney, Agent, or Firm* — Michael Best & Friedrich LLP

(57) ABSTRACT

The invention relates to a proportional valve (1) for controlling a gaseous medium, in particular hydrogen, comprising a valve housing (2), in which a closing element (10) arranged therein interacts with a valve seat (19) in order to open and close at least one passage opening (18). Furthermore, an armature device (25), which is operatively connected to the closing element (10), and an electromagnet (26) are provided, by means of which electromagnet a magnetic force can be produced on the armature device (25) and the armature device (25) can move reciprocatingly along a longitudinal axis (40) of the proportional valve (1). Moreover, the electromagnet (26) comprises an inner pole (14), an outer pole (13) and a solenoid coil (12) and the armature device (25) composes an armature (8). The valve housing (2) and the inner pole (14) are magnetically connected to each other by means of a magnetic choke point (20). The magnetic choke point (20) is formed in an axial region of extent of the armature (8). Furthermore, the inner pole (14) has a cavity (21) having a cavity edge (35). The armature (8) plunges in said cavity (21) during the reciprocating motion (Continued)

of said armature. In a closed position of the proportional valve (1), an end face (33) of the armature (8) lies at the same height as the cavity edge (35) of the cavity (21) with respect to the longitudinal axis (40), the cavity edge (35) forming the end of the magnetic choke point (20).

22 Claims, 3 Drawing Sheets

(51) Int. Cl.
*H01F 7/121* (2006.01)
*H01F 7/16* (2006.01)
*H01M 8/04089* (2016.01)
*H01M 8/04082* (2016.01)

(52) U.S. Cl.
CPC ........... *H01F 7/121* (2013.01); *H01F 7/1607* (2013.01); *H01M 8/04089* (2013.01); *H01M 8/04201* (2013.01); *H01F 2007/086* (2013.01)

(58) Field of Classification Search
USPC ............................. 251/129.15; 335/236, 281
See application file for complete search history.

(56) References Cited

U.S. PATENT DOCUMENTS

| | | | | |
|---|---|---|---|---|
| 6,601,822 | B2* | 8/2003 | Tachibana | F16K 31/0613 137/625.69 |
| 7,036,788 | B1* | 5/2006 | Schneider | G05D 16/2022 251/86 |
| 7,280,021 | B2* | 10/2007 | Nagasaki | H01F 7/13 335/227 |
| 7,401,762 | B2* | 7/2008 | Ohmori | F16K 31/0655 251/282 |
| 8,585,014 | B2* | 11/2013 | Oikawa | H01F 7/1607 251/129.15 |
| 8,973,894 | B2* | 3/2015 | Ozaki | F16K 31/0655 251/129.15 |
| 2002/0139951 | A1* | 10/2002 | Kawamura | F16K 31/0613 251/129.15 |
| 2005/0145813 | A1 | 7/2005 | Kumar | |
| 2005/0269538 | A1* | 12/2005 | Haynes | F16K 31/0627 251/129.15 |
| 2011/0089352 | A1* | 4/2011 | Morgan | F16K 31/0613 251/129.15 |
| 2011/0284781 | A1* | 11/2011 | Keller | F16K 37/005 251/129.15 |
| 2013/0167950 | A1 | 7/2013 | Nomichi et al. | |
| 2014/0084195 | A1 | 3/2014 | Hakoda et al. | |
| 2014/0145101 | A1* | 5/2014 | Ishibashi | F16K 31/0675 251/129.15 |
| 2014/0158921 | A1 | 6/2014 | Ishibashi et al. | |
| 2016/0084397 | A1 | 3/2016 | Boban et al. | |
| 2017/0074417 | A1 | 3/2017 | Okawara | |

FOREIGN PATENT DOCUMENTS

| | | |
|---|---|---|
| DE | 102012204565 | 9/2013 |
| DE | 102014013602 | 10/2015 |
| JP | 2004179118 A | 6/2004 |
| JP | 2007142221 A | 6/2007 |
| JP | 2009203992 A | 9/2009 |

\* cited by examiner

PROPORTIONAL VALVE FOR CONTROLLING A GASEOUS MEDIUM

BACKGROUND OF THE INVENTION

The invention relates to a proportional valve for controlling a gaseous medium, in particular hydrogen, for example for use in vehicles having a fuel cell drive.

DE 10 2012 204 565 A1 describes a proportional valve for controlling a gaseous medium, in particular hydrogen, the proportional valve comprising a valve body, a closing element and an elastic sealing element. At least one passage opening is configured in the valve opening, which passage opening can be released or closed by way of the closing element on a valve seat. Here, the elastic sealing element seals on the valve seat. The closing element can be moved in a stroke movement by means of a magnet armature by way of an electromagnet which comprises a magnet core and a magnet coil, and is loaded with force in the direction of the valve seat by way of a spring.

Frequent opening and closing operations occur in the normal operating range of the proportional valve. To this end, a stroke movement of the closing element takes place by means of a magnetic force which is generated by the electromagnet. For an optimum magnetic flux, the valve body and the magnet core are connected via a non-magnetic sleeve in the case of the known proportional valve. This leads to increased tolerances in the guide of the magnet armature within the valve body, however, which leads to wear on the magnet armature, and also on the closing element.

SUMMARY OF THE INVENTION

In contrast, the proportional valve according to the invention for controlling a gaseous medium, in particular hydrogen, has the advantage that the valve body and the magnet core are configured in one piece, the connecting point of the two components being configured in such a way that an optimum function of the proportional valve is achieved.

To this end, the proportional valve for controlling a gaseous medium, in particular hydrogen, has a valve housing, in which a closing element which is arranged therein interacts with a valve seat in order to open and close at least one passage opening. Furthermore, there are a magnet armature apparatus which is operatively connected to the closing element, and an electromagnet, by way of which a magnetic force can be generated on the magnet armature apparatus, and the magnet armature apparatus can be moved with a stroke movement along a longitudinal axis of the proportional valve. The electromagnet comprises an inner pole, an outer pole and a magnet coil, and the magnet armature apparatus comprises a magnet armature. The valve housing and the inner pole are connected magnetically to one another via a magnetic choke point, and the magnetic choke point is configured in an axial extent region of the magnet armature. Moreover, the inner pole has a recess with a recess edge, into which recess the magnet armature dips during its stroke movement. An end face of the magnet armature lies at the same height with regard to the longitudinal axis as the recess edge of the recess in a closed position of the proportional valve. The recess edge forms the end of the magnetic choke point.

The valve housing and the inner pole are connected to one another via the magnetic choke point magnetically, but also mechanically. As a result of the single-piece configuration of the two components, the use of a non-magnetic sleeve is dispensed with, as a result of which the wear of individual components, such as for example the magnet armature, in the proportional valve is reduced and the tightness of the proportional valve is increased overall. Furthermore, the magnetic choke point is configured in such a way that it optimizes the method of operation of the proportional valve. The course of the magnetic field lines in the inner pole and in the valve housing and at the magnetic choke point can thus be influenced in such a way that any desired stroke of the magnet armature can be carried out depending on the requirement of the hydrogen mass flow.

It is provided in a first advantageous refinement of the invention that the magnetic choke point comprises a thin-walled cylindrical web. The magnetic choke point advantageously comprises a conical region which, together with the web and the magnet armature, configures an annular groove. As a result, the magnetic flux leakage at the thin-walled cylindrical web is low, with the result that the magnetic flux through the web has only a slight influence on the stroke of the magnet armature. Precise control of the proportional valve is possible as a result.

In one advantageous development, the web and the magnet coil delimit a cavity in the valve housing. This contributes to a structurally simple overall design of the proportional valve. The thin-walled cylindrical web aids a low flux leakage of the magnetic field lines in the web in the direction of the magnet armature, since only a small radial magnetic pole area is configured, by way of which its stroke is scarcely influenced.

It is advantageously provided in a further refinement of the invention that the magnet armature apparatus is guided in a first guide section and a second guide section in the valve housing and the inner pole. First bearing bushes are advantageously arranged on the first guide section, in which first bearing bushes a connecting element which is surrounded by the magnet armature apparatus is received and guided. Second bearing bushes can likewise be advantageously arranged on the second guide section, in which second bearing bushes the magnet armature is received and guided.

As a result, the magnet armature apparatus is arranged in the valve housing in the radial direction in such a way that radial tilting with regard to the valve seat is minimized and an optimum tightness of the proportional valve is thus achieved.

It is advantageously provided in a further refinement of the invention that second bearing bushes are arranged on the second guide section, in which second bearing bushes the connecting element is received and guided on a piston-shaped section. The connecting element, in particular the piston-shaped section, is advantageously produced from a material with a high mechanical strength. As a result, radial tilting of the magnet armature apparatus is minimized, and the wear on the magnet armature is also reduced if the guidance takes place on the connecting element of the magnet armature apparatus. Furthermore, said connecting element can then be adapted to the mechanical conditions, such as for example the selection of a material with a high mechanical strength.

It is provided in one advantageous development that an elastic sealing element is arranged between the closing element and the valve seat. The valve seat is advantageously configured as a flat seat. The tightness of the proportional valve can be ensured in a simple way and without great structural modifications by way of the use of a flat valve seat in combination with an elastic sealing element in order to seal off at the valve seat, with the result that, for example, no hydrogen can escape from the proportional valve.

It is advantageously provided in a further refinement of the invention that a closing spring is arranged in the valve housing, which closing spring is supported between the connecting element of the magnet armature apparatus and the valve housing and loads the magnet armature apparatus with force in the direction of the valve seat. The closing spring therefore ensures the seating of the elastic sealing element on the valve seat, with the result that an optimum tightness of the metering apparatus is achieved.

In a further refinement of the invention, there is an interior space in the valve housing, which interior space is divided by way of the inner pole or the valve housing into a spring space and a magnet armature space. An inlet duct is advantageously configured in the valve housing radially with respect to the longitudinal axis of the proportional valve, via which inlet duct gaseous medium, preferably hydrogen, can enter into the proportional valve. A simple and structurally compact design is promoted as a result.

The described proportional valve is preferably suitable in a fuel cell arrangement for controlling a hydrogen feed to an anode region of a fuel cell.

BRIEF DESCRIPTION OF THE DRAWINGS

Exemplary embodiments of a proportional valve according to the invention for controlling a gas feed, in particular hydrogen to a fuel cell, are shown in the drawing, in which.

DETAILED DESCRIPTION

Figure 1:
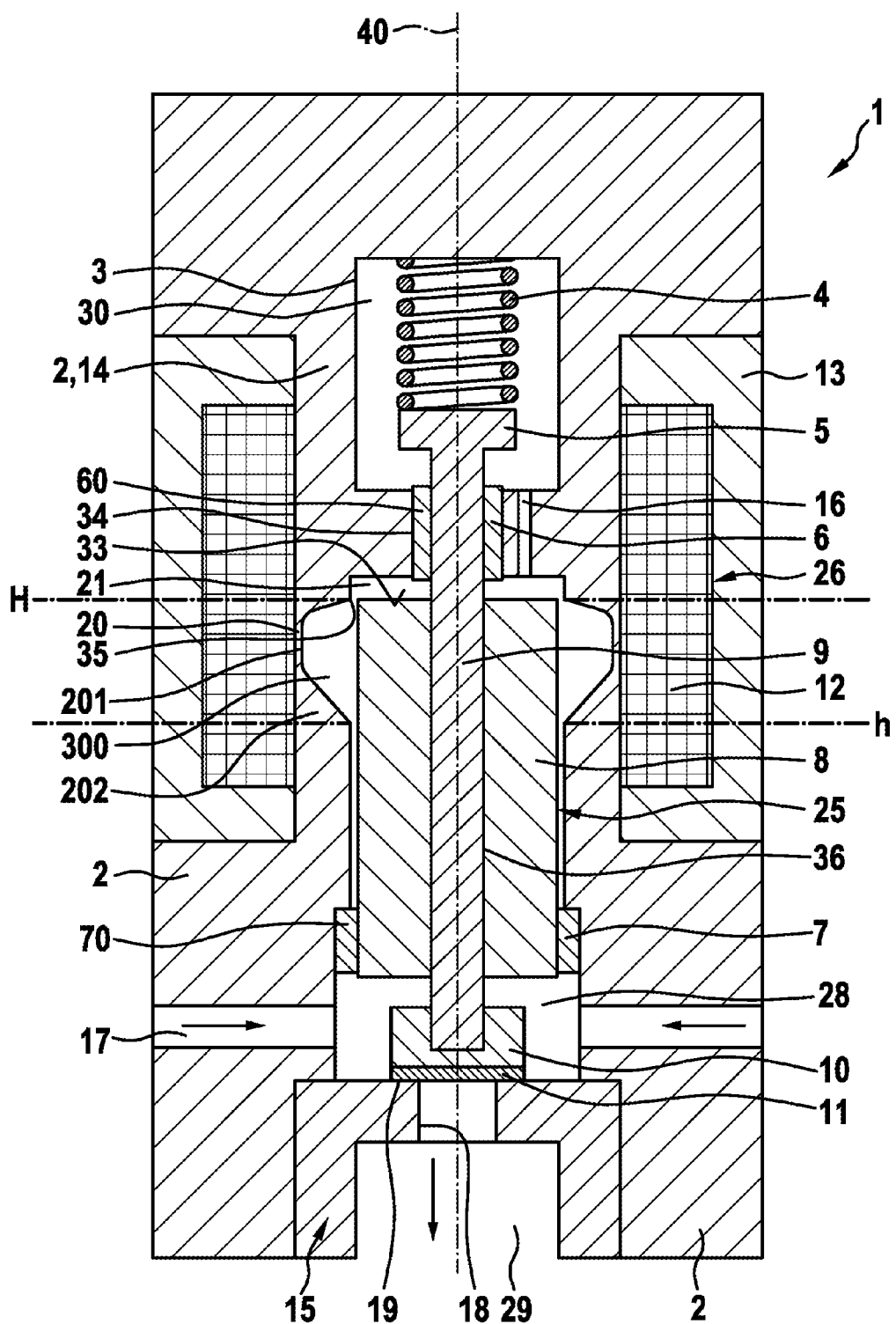
FIG. 1 shows a first exemplary embodiment of a proportional valve according to the invention in longitudinal section.

FIG. 1 shows a first exemplary embodiment of a proportional valve 1 according to the invention in longitudinal section. The proportional valve 1 has a valve housing 2 with an interior space 3. An electromagnet 26 which comprises a magnet coil 12, an inner pole 14 and an outer pole 13 is arranged in the interior space 3.

Furthermore, a magnet armature apparatus 25 which can be moved in a stroke movement is arranged in the interior space 3. The magnet armature apparatus 25 comprises a magnet armature 8 and a connecting element 9 which is received in a recess 36 of the magnet armature 8 and is therefore connected fixedly to the magnet armature 8, for example by way of a welded seam or by way of pressing. The magnet armature 8 is configured as a solenoid plunger and is received in the inner pole 14. The inner pole 14 has a recess 21 with a recess edge 35, into which recess 21 the magnet armature 8 dips during its stroke movement. An end face 33 of the magnet armature 8 lies at a height H with regard to a longitudinal axis 40 of the proportional valve 1 and at the same height as the recess edge 35 of the recess 21 in a closed position of the proportional valve 1. In the case of a stroke movement of the magnet armature 8, the latter is received directly in the recess 21.

First bearing bushes 60 are arranged on the inner pole 14 in a recess 34, in which first bearing bushes 60 the connecting element 9 is received and guided on a first guide section 6 of the inner pole 14. Furthermore, second bearing bushes 70 are arranged on the valve housing 2, in which second bearing bushes 70 the magnet armature 8 is received and guided.

The connecting element 9 is connected fixedly at one end to a closing element 10. At its end which faces away from the connecting element 9, the closing element 10 has an elastic sealing element 11.

The valve housing 2 comprises a nozzle body 15 which has a passage opening 18, as a result of which an inflow region 28 can be connected to an outflow region 29. A flat valve seat 19 is configured on the nozzle body 15, which flat valve seat 19 interacts with the elastic sealing element 11 of the closing element 10, with the result that the passage opening 18 is closed when the closing element 10 lies with the elastic sealing element 11 on the flat valve seat 19.

A spring space 30 which forms a part of the interior space 3 is configured in the inner pole 14. A closing spring 4 is arranged in the spring space 30, which closing spring 4 is supported between the inner pole 14 and a plate-shaped end 5 of the connecting element 9. The closing spring 4 loads the magnet armature apparatus 25 with a force in the direction of the valve seat 19.

Furthermore, the interior space 3 comprises a magnet armature space 300, in which the magnet armature 8 is arranged. The magnet armature space 300 is connected via a connecting duct 16 to the spring space 30. At its end which faces the closing element 10, the magnet armature 8 adjoins the inflow region 28 which can be filled with gaseous medium, for example hydrogen, via an inlet duct 17 which is arranged radially with regard to the longitudinal axis 40 of the proportional valve 1.

The valve housing 2 and the inner pole 14 are connected to one another magnetically and mechanically via a magnetic choke point 20. They can advantageously be configured in one piece. The magnetic choke point 20 comprises a thin-walled cylindrical web 201 and a conical region 202, as a result of which an annular groove 302 is configured in the magnet armature space 300. The thin-walled cylindrical web 201 has a wall thickness of between 0.2 mm and 0.5 mm, preferably of between 0.3 mm and 0.35 mm. A cylindrical web 201 which is as thin-walled as possible is thus made possible, the stability of the valve housing 2 and/or the inner pole 14 being ensured at the same time. The magnetic choke point 20 extends from the recess edge 35 of the recess 21 at the height H in the direction of the closing element 10 to a height h with regard to the longitudinal axis 40 on the magnet armature 8.

Method of Operation of the Proportional Valve 1

In the case of a non-energized magnet coil 12, the closing element 10 is pressed onto the valve seat 19 via the closing spring 4, with the result that the connection between the inflow region 28 and the outflow region 29 is interrupted and no throughflow of gas takes place.

If the magnet coil 12 is energized, a magnetic force is generated on the magnet armature 8 which is directed counter to the closing force of the closing spring 4. Said magnetic force is transmitted via the connecting element 9 to the closing element 10, with the result that the closing force of the closing spring 4 is overcompensated and lifts the closing element 10 from the valve seat 19. A throughflow of gas is released by way of the proportional valve 1.

The stroke of the closing element 10 can be set via the magnitude of the current strength on the magnet coil 12. The higher the current strength on the magnet coil 12, the greater the stroke of the closing element 10 and the higher also the throughflow of gas in the proportional valve 1, since the force of the closing spring 4 is dependent on the stroke. If the current strength on the magnet coil 12 is reduced, the stroke of the closing element 10 is also reduced, and the throughflow of gas is therefore throttled.

The magnetic flux leakage which originates from the magnetic field lines at the magnetic choke point 20 is low, with the result that this scarcely influences the stroke movement of the magnet armature 8. If the magnet armature 8 dips into the recess 21 of the inner pole 14, the flux leakage of the magnetic field lines in the inner pole 14 or the valve housing 2 increases, with the result that the magnetic influence on the magnet armature 8 rises. As a result, the stroke height of the magnet armature 8 can be set in a variable manner.

If the current on the magnet coil 12 is interrupted, the magnetic force on the magnet armature 8 is dissipated, with the result that the force on the closing element 10 by means of the connecting element 9 is reduced. The closing element 10 moves in the direction of the passage opening 18 and seals by way of the elastic sealing element 11 on the valve seat 19. The throughflow of gas in the proportional valve 1 is interrupted.

Figure 2:
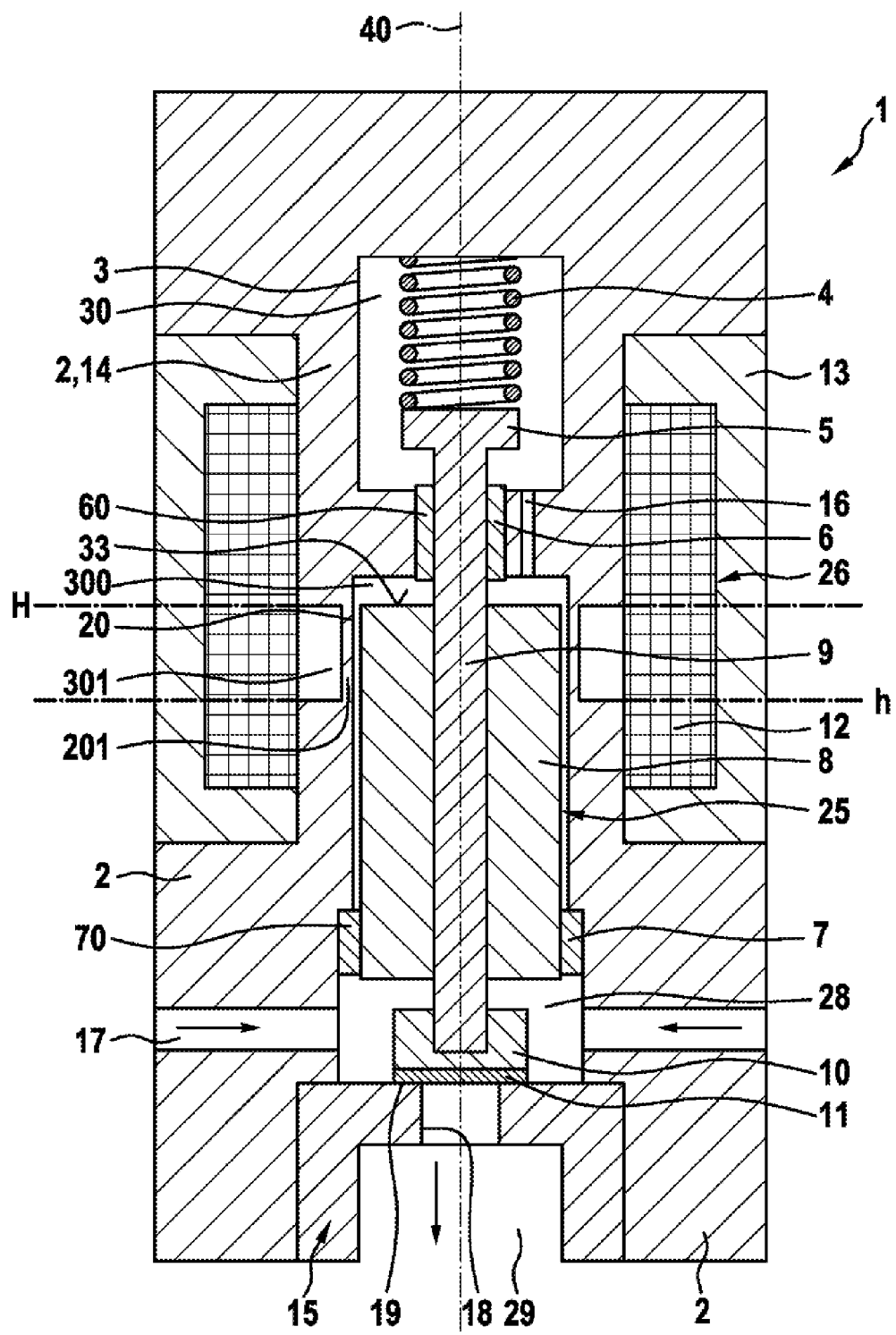
FIG. 2 shows a second exemplary embodiment of the proportional valve according to the invention in longitudinal section.

FIG. 2 shows a further exemplary embodiment of the proportional valve 1 according to the invention in longitudinal section. Components with an identical function are denoted by way of the same designations. In comparison with FIG. 1, the thin-walled cylindrical web 201 is configured in said exemplary embodiment in such a way that, together with the magnet coil 12, it delimits a cavity 301. The cavity 301 is of rectangular configuration in cross section.

The remaining design and the method of operation of the exemplary embodiment which is shown in FIG. 2 correspond to the exemplary embodiment from FIG. 1.

Figure 3:
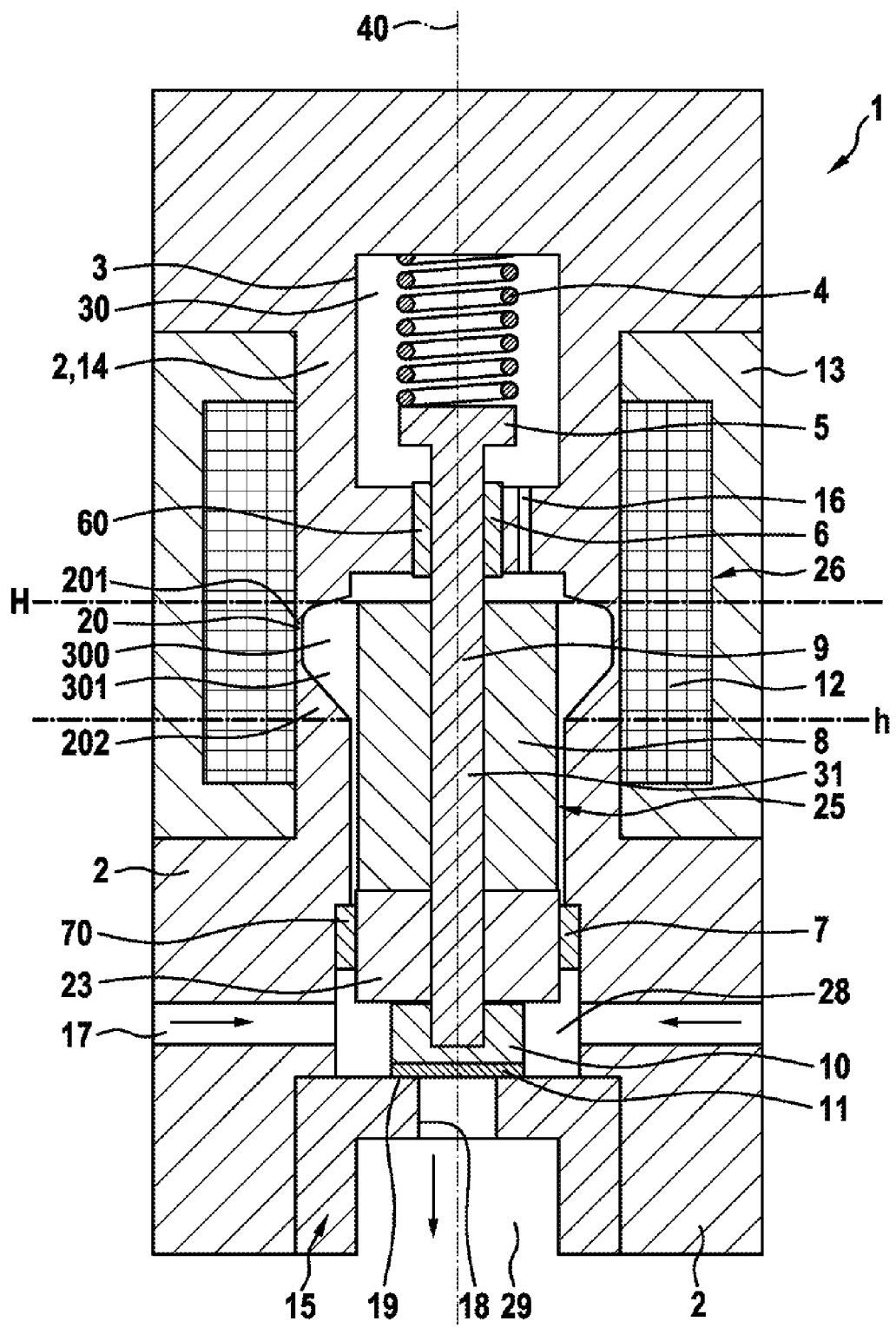
FIG. 3 shows a third exemplary embodiment of the proportional valve according to the invention in longitudinal section.

FIG. 3 shows a further exemplary embodiment of the proportional valve 1 according to the invention in longitudinal section. Components with an identical function are denoted by way of the same designations. Here, in comparison with FIG. 1, a piston-shaped section 23 of the connecting element 9 is received and guided on the second bearing bushes 70 instead of the magnet armature 8. Here, the connecting element 9 is produced from a material with a high mechanical strength.

The proportional valve 1 according to the invention can be used, for example, in a fuel cell arrangement. Hydrogen from a tank can be fed to an anode region of the fuel cell by means of the proportional valve 1. Depending on the magnitude of the current strength on the magnet coil 12 of the proportional valve 1, by way of which magnet coil 12 the stroke of the closing element 10 is actuated, a flow cross section of the passage opening 18 is therefore changed in such a way that the gas stream which is fed to the fuel cell is set as required continuously.

The proportional valve 1 for controlling a gaseous medium therefore has the advantage that, here, the feed of the first gaseous medium and the metering of hydrogen into the anode region of the fuel cell can take place in a substantially more exact manner by means of electronically controlled adaptation of the flow cross section of the passage opening 18 with simultaneous regulation of the anode pressure. As a result, the operational reliability and durability of the connected fuel cell are improved considerably, since hydrogen is always fed in in a hyperstoichiometric proportion. In addition, consequential damage, such as for example damage of a downstream catalytic converter, can also be prevented.

What is claimed is:

1. A proportional valve (1) for controlling a gaseous medium, having a valve housing (2), in which a closing element (10) which is arranged therein interacts with a valve seat (19) in order to open and close at least one passage opening (18), having a magnet armature apparatus (25) which is operatively connected to the closing element (10), and having an electromagnet (26) configured to generate a magnetic force on the magnet armature apparatus (25), such that the magnet armature apparatus (25) can be moved with a stroke movement along a longitudinal axis (40) of the proportional valve (1), the stroke movement including movement of the magnet armature apparatus (25) in an opening direction away from the valve seat (19) and in a closing direction opposite of the opening direction, the electromagnet (26) comprising an inner pole (14), an outer pole (13) and a magnet coil (12), and the magnet armature apparatus (25) comprising a magnet armature (8), the valve housing (2) and the inner pole (14) being connected magnetically to one another via a magnetic choke point (20), and the magnetic choke point (20) being configured in an axial extent region of the magnet armature (8), wherein the inner pole (14) has a recess (21) with a recess edge (35) forming an end of the magnetic choke point (20), the recess (21) extending in the opening direction from the recess edge (35), wherein the magnet armature (8) has an end face (33) that is positioned furthest on the magnet armature (8) in the opening direction, wherein, in a closed state of the proportional valve (1), the end face (33) of the magnet armature (8) lies at a same position along the longitudinal axis (40) as the recess edge (35), and wherein, during the stroke movement in the opening direction, the magnet armature (8) dips into the recess (21).

2. The proportional valve (1) as claimed in claim 1, wherein the magnetic choke point (20) comprises a thin-walled cylindrical web (201).

3. The proportional valve (1) as claimed in claim 2, wherein the magnetic choke point (20) comprises a conical region (202) which forms an annular groove (302) together with the thin-walled cylindrical web (201) and the magnet armature (8).

4. The proportional valve (1) as claimed in claim 2, wherein the thin-walled cylindrical web (201) and the magnet coil (12) delimit a cavity (301) in the valve housing (2).

5. The proportional valve (1) as claimed in claim 1, wherein the magnet armature apparatus (25) is guided in a first guide section (6) and a second guide section (7) in the valve housing (2) and the inner pole (14).

6. The proportional valve (1) as claimed in claim 5, wherein first bearing bushes (60) are arranged on the first guide section (6), wherein a connecting element (9), which is surrounded by the magnet armature apparatus (25), is received and guided in the first bearing bushes (60).

7. The proportional valve (1) as claimed in claim 5, wherein second bearing bushes (70) are arranged on the second guide section (7), wherein the magnet armature (8) or the connecting element (9) is received and guided on a piston-shaped section (23) in the second bearing bushes (70).

8. The proportional valve (1) as claimed in claim 7, wherein the connecting element (9) is produced from a material with a high mechanical strength.

9. The proportional valve (1) as claimed in claim 1, wherein an elastic sealing element (11) is arranged between the closing element (10) and the valve seat (19).

10. The proportional valve (1) as claimed in claim 1, wherein a closing spring (4) is arranged in the valve housing (2), and wherein the closing spring (4) is supported between the connecting element (9) of the magnet armature apparatus (25) and the valve housing (2) and loads the magnet armature apparatus (25) with force in the second direction.

11. The proportional valve (1) as claimed in claim 1, further comprising an interior space (3) which is divided by way of the inner pole (14) or the valve housing (2) into a spring space (30) and a magnet armature space (300) in the valve housing (2).

12. The proportional valve (1) as claimed in claim 1, wherein an inlet duct (17) is configured in the valve housing (2) radially with respect to the longitudinal axis (40) of the proportional valve (1), wherein the gaseous medium can enter into the proportional valve (1) via the inlet duct (17).

13. A fuel cell arrangement comprising a fuel cell and a proportional valve (1) for controlling a hydrogen feed to the fuel cell, the proportional valve having a valve housing (2), in which a closing element (10) which is arranged therein interacts with a valve seat (19) in order to open and close at least one passage opening (18), having a magnet armature apparatus (25) which is operatively connected to the closing element (10), and having an electromagnet (26) configured to generate a magnetic force on the magnet armature apparatus (25), such that the magnet armature apparatus (25) can be moved with a stroke movement along a longitudinal axis (40) of the proportional valve (1), the stroke movement including movement of the magnet armature apparatus (25) in an opening direction away from the valve seat (19) and in a closing direction opposite of the opening direction, the electromagnet (26) comprising an inner pole (14), an outer pole (13) and a magnet coil (12), and the magnet armature apparatus (25) comprising a magnet armature (8), the valve housing (2) and the inner pole (14) being connected magnetically to one another via a magnetic choke point (20), and the magnetic choke point (20) being configured in an axial extent region of the magnet armature (8), wherein the inner pole (14) has a recess (21) with a recess edge (35) forming an end of the magnetic choke point (20), the recess (21) extending in the opening direction from the recess edge (35), wherein the magnet armature (8) has an end face (33) that is positioned furthest on the magnet armature (8) in the opening direction, wherein, in a closed state of the proportional valve (1), the end face (33) of the magnet armature (8) lies at a same position along the longitudinal axis (40) as the recess edge (35), and wherein, during a stroke movement in the opening direction, the magnet armature (8) dips into the recess (21).

14. The proportional valve (1) as claimed in claim 6, wherein second bearing bushes (70) are arranged on the second guide section (7), wherein the magnet armature (8) or the connecting element (9) is received and guided on a piston-shaped section (23) in the second bearing bushes (70).

15. The proportional valve (1) as claimed in claim 14, wherein the piston-shaped section (23) is produced from a material with a high mechanical strength.

16. A proportional valve (1) for controlling a gaseous medium, having a valve housing (2), in which a closing element (10) which is arranged therein interacts with a valve seat (19) in order to open and close at least one passage opening (18), having a magnet armature apparatus (25) which is operatively connected to the closing element (10), and having an electromagnet (26) configured to generate a magnetic force on the magnet armature apparatus (25), such that the magnet armature apparatus (25) can be moved with a stroke movement along a longitudinal axis (40) of the proportional valve (1), the stroke movement including movement of the magnet armature apparatus (25) in an opening direction away from the valve seat (19) and in a closing direction opposite of the opening direction, the electromagnet (26) comprising an inner pole (14), an outer pole (13) and a magnet coil (12), and the magnet armature apparatus (25) comprising a magnet armature (8), the valve housing (2) and the inner pole (14) being connected magnetically to one another via a magnetic choke point (20), and the magnetic choke point (20) being configured in an axial extent region of the magnet armature (8), wherein the inner pole (14) has a recess (21) with a recess edge (35) forming an end of the magnetic choke point (20), the recess (21) extending in the opening direction from the recess edge (35), wherein the magnet armature (8) has an end face (33) that is positioned furthest on the magnet armature (8) in the opening direction, wherein, in a closed state of the proportional valve (1), the end face (33) of the magnet armature (8) lies between the recess edge (35) and the valve seat (19) along the longitudinal axis (40), and wherein, during the stroke movement in the opening direction, the magnet armature (8) dips into the recess (21).

17. The proportional valve (1) as claimed in claim 1, wherein the longitudinal axis (40) is a centerline of the proportional valve (1), and wherein the recess edge (35) and the magnetic choke point (20) define a magnetic armature space that opens toward the centerline of the proportional valve (1).

18. The proportional valve (1) as claimed in claim 1, wherein the entire end face (33) of the magnet armature (8) lies in a plane perpendicular to the longitudinal axis (40).

19. The proportional valve (1) as claimed in claim 13, wherein the longitudinal axis (40) is a centerline of the proportional valve (1), and wherein the recess edge (35) and the magnetic choke point (20) define a magnetic armature space that opens toward the centerline of the proportional valve (1).

20. The proportional valve (1) as claimed in claim 13, wherein the entire end face (33) of the magnet armature (8) lies in a plane perpendicular to the longitudinal axis (40).

21. The proportional valve (1) as claimed in claim 16, wherein the longitudinal axis (40) is a centerline of the proportional valve (1), and wherein the recess edge (35) and the magnetic choke point (20) define a magnetic armature space that opens toward the centerline of the proportional valve (1).

22. The proportional valve (1) as claimed in claim 16, wherein the entire end face (33) of the magnet armature (8) lies in a plane perpendicular to the longitudinal axis (40).

* * * * *